United States Patent [19]
Daiber et al.

[11] 4,129,835
[45] Dec. 12, 1978

[54] METHOD AND APPARATUS FOR THE CONTINUOUS GENERATION OF METAL VAPOR

[75] Inventors: John W. Daiber; John W. Raymonda, both of Williamsville, N.Y.

[73] Assignee: Calspan Corporation, Buffalo, N.Y.

[21] Appl. No.: 745,155

[22] Filed: Nov. 26, 1976

[51] Int. Cl.² ............................................. H01S 3/095
[52] U.S. Cl. ............................... 331/94.5 G; 266/144; 423/490
[58] Field of Search ................... 423/490; 331/94.5 G, 331/94.5 PE; 75/67; 266/144

[56] References Cited

U.S. PATENT DOCUMENTS

| 3,906,398 | 9/1975 | Low et al. | 331/94.5 G |
| 3,936,772 | 2/1976 | Sucov et al. | 331/94.5 G |
| 3,979,205 | 9/1976 | Wanzenberg | 75/10 R |

Primary Examiner—William L. Sikes
Assistant Examiner—Marcus S. Rasco
Attorney, Agent, or Firm—Allen J. Jaffe; David J. Zobkiw

[57] ABSTRACT

The generation of visible or ultraviolet chemical laser radiation is achieved by the vapor phase combustion of metal atoms. The vapor is formed in a precombustor and metal vapor is extracted from the precombustor and fed via a supersonic nozzle to the laser cavity where it is reacted with an oxidant to produce excited molecules and thereby lasing.

6 Claims, 3 Drawing Figures

METHOD AND APPARATUS FOR THE CONTINUOUS GENERATION OF METAL VAPOR

The generation of visible or ultraviolet chemical laser radiation requires a chemical reaction satisfying three criteria: (1) it must be sufficiently exothermic to populate at least one excited state having a radiative transition in the visible or ultraviolet spectral region; (2) a product molecule must be formed almost exclusively in an excited state with transitions to a lower state of such a nature as to encourage laser action; and (3) the reaction must proceed fast enough under some realizable operating condition that the rate of excited state pumping exceeds the rate of excited state loss. One class of reactions favorable for such laser action is the vapor phase combustion of metal atoms. A continuous stream of metal vapor may be generated by heating the metal in an oven, generally using electric resistance heaters to supply the heat. The difficulty with this technique is that it is difficult to generate a high density of vapor in a fast moving stream. The required metal fluxes can be generated in a shock tube system but only for brief periods.

The present invention eliminates the shortcomings of the presently employed methods by burning a fuel rich metal-oxidant mixture in a precombustor to produce the metal vapor. The metal is introduced into the precombustor in the form of a powder or some other condensed phase form such as a rod of metal fed at a controlled rate. Introduction of the metal to the precombustor may also be achieved through the use of fluidized beds, shakers or centrifugal feeders. The vapor is formed in the precombustor by direct heating of the solid particles. This requires carrying more metal and oxidant but eliminates the need for heavy electrical equipment. The excess metal is vaporized and can be extracted from the precombustor by a supersonic nozzle that leads to the laser cavity. An oxidant is introduced in the supersonic region and reacts with the metal vapor to form suitable excited molecules.

The oxidant used in the precombustor should be one that releases a lot of heat so that a minimum amount of fuel is consumed. Fluorine is generally a good choice, however other considerations such as the natural danger of carrying fluorine may dictate the use of an alternative oxidizer. It is important that the metal-oxidant product formed in the precombustor not interfere with the laser action. This requires that: (1) none of the product gases have absorption bands in the laser spectral region of interest; and (2) if the product gas tends to condense, that the particulates thus formed not reach the laser cavity where they could scatter the laser beam. Condensation of the product is desirable because this releases additional heat for vaporizing the metal fuel.

It is an object of this invention to provide a method and apparatus for the continuous generation of metal vapor.

It is an additional object of this invention to provide a method of and apparatus for generating large fluxes of metal vapor.

It is a further object of this invention to provide a scalable method and apparatus for generating a continuous stream of metal vapor. These objects, and others as will become apparent hereinafter, are accomplished by the present invention.

Basically, the present invention includes the controlled feeding of metal, oxidant and diluent to a precombustion chambeer where the oxidant and a portion of the metal react in an exothermic reaction which causes the vaporization of the excess metal. The vaporized metal is extracted from the precombustor via a supersonic nozzle that leads to the laser cavity. In the supersonic region, an oxidant is introduced which reacts with the metal vapor to form suitable excited molecules which are supplied to the laser cavity.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENT

Figure 1:
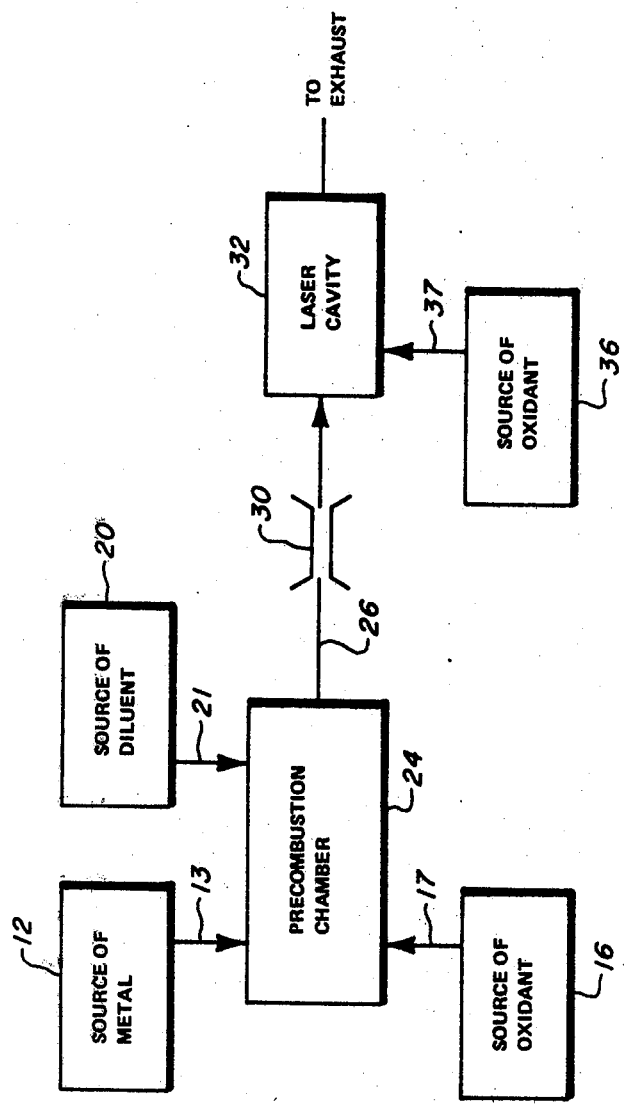
FIG. 1 is a block diagram of the system of the present invention.

As is best shown in FIG. 1, metal, oxidant and diluent are supplied from sources thereof, 12, 16 and 20, via lines 13, 17 and 21, respectively, to precombustion chamber 24. In the precombustion chamber 24, the oxidant reacts in an exothermic reaction with the metal which is supplied in excess. At least a portion of the excess metal is vaporized and is drawn off from precombustion chamber 24 via line 26 and supersonic nozzle 30 and is fed to laser cavity 32. An oxidant is delivered via line 37 from oxidant source 36 into the supersonic region downstream of the supersonic nozzle 30 where the oxidant reacts with the metal vapor to form excited molecules thereby producing a population inversion and lasing.

Figure 2:
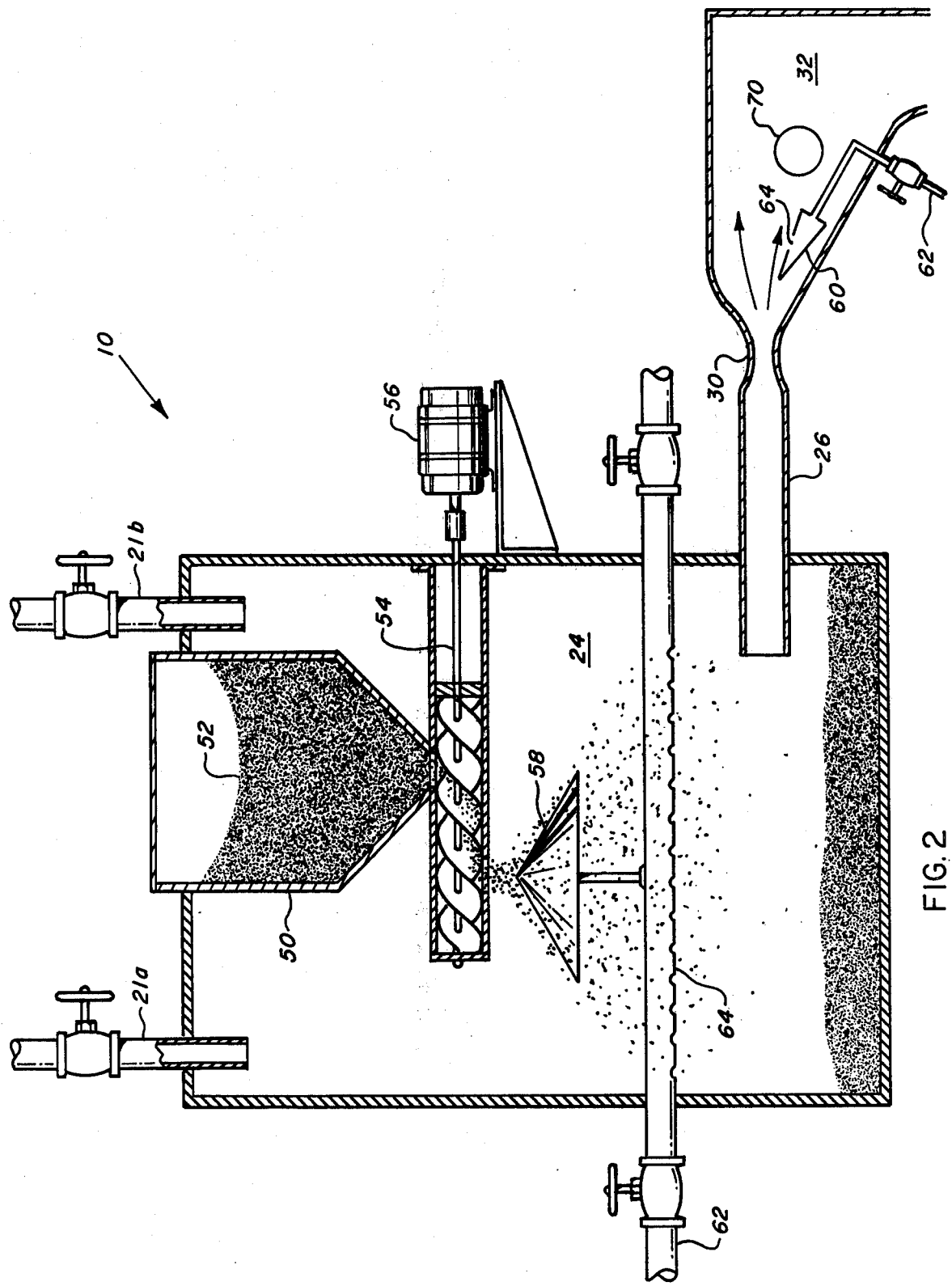
FIG. 2 is a partially sectioned view of exemplary apparatus.

One embodiment of apparatus for the continuous generation of metal vapor is illustrated in FIG. 2 and is generally designated 10. The source of the metal, 12 of FIG. 1, includes a hopper 50 containing metal powder 52. At the bottom of the hopper 50 is located a worm feed mechanism 54 which is driven at a selectively variable rate by motor 56. The metal powder 52 delivered by worm feed mechanism 54 is dispersed within the precombustion chamber 24 by generally conical diffuser 58. The source of diluent, 20 of FIG. 1, is connected to apparatus 10 via one or more valved lines, 21a and 21b, two being illustrated. The source of oxidant, 16 of FIG. 1, is connected via valved line 62 to a sparger or manifold 64 located in the precombustion chamber 24. The bottom portion of the precombustion chamber constitutes a settling chamber for the large particles formed in the chemical reaction between the metal and oxidant. The metal vapor and diluent are drawn off from the precombustion chamber 24 via line 26 and supersonic nozzle 30 and are delivered to the laser cavity 32. Small particles formed in the chemical reaction between the metal and oxidant and carried by the nozzle expansion into the laser cavity act as scattering centers and thereby increase the losses and reduce efficiency. These small particles are removed by centrifuging the stream through a steady Prandtl-Meyer expansion fan created by turning wedge 60 which is located in the supersonic stream downstream of supersonic nozzle 30. The Prandtl-Meyer expansion fan directs the particles away from the optical axis of the laser cavity 32 which is perpendicular to mirror 70, as illustrated. The gas, namely the metal vapor and diluent, is directed toward the optical axis of the laser cavity 32 by the Prandtl-Meyer expansion fan. The source of oxidant, 36 of FIG. 1, is connected via valved line 62 with choked orifice 64 in wedge 60 and is located upstream of the optical axis of the laser cavity 32. The oxidant which may be the same oxidant used in the precombustion chamber but in general will not be, reacts with the metal vapor to form excited molecules thereby causing lasing.

Figure 3:
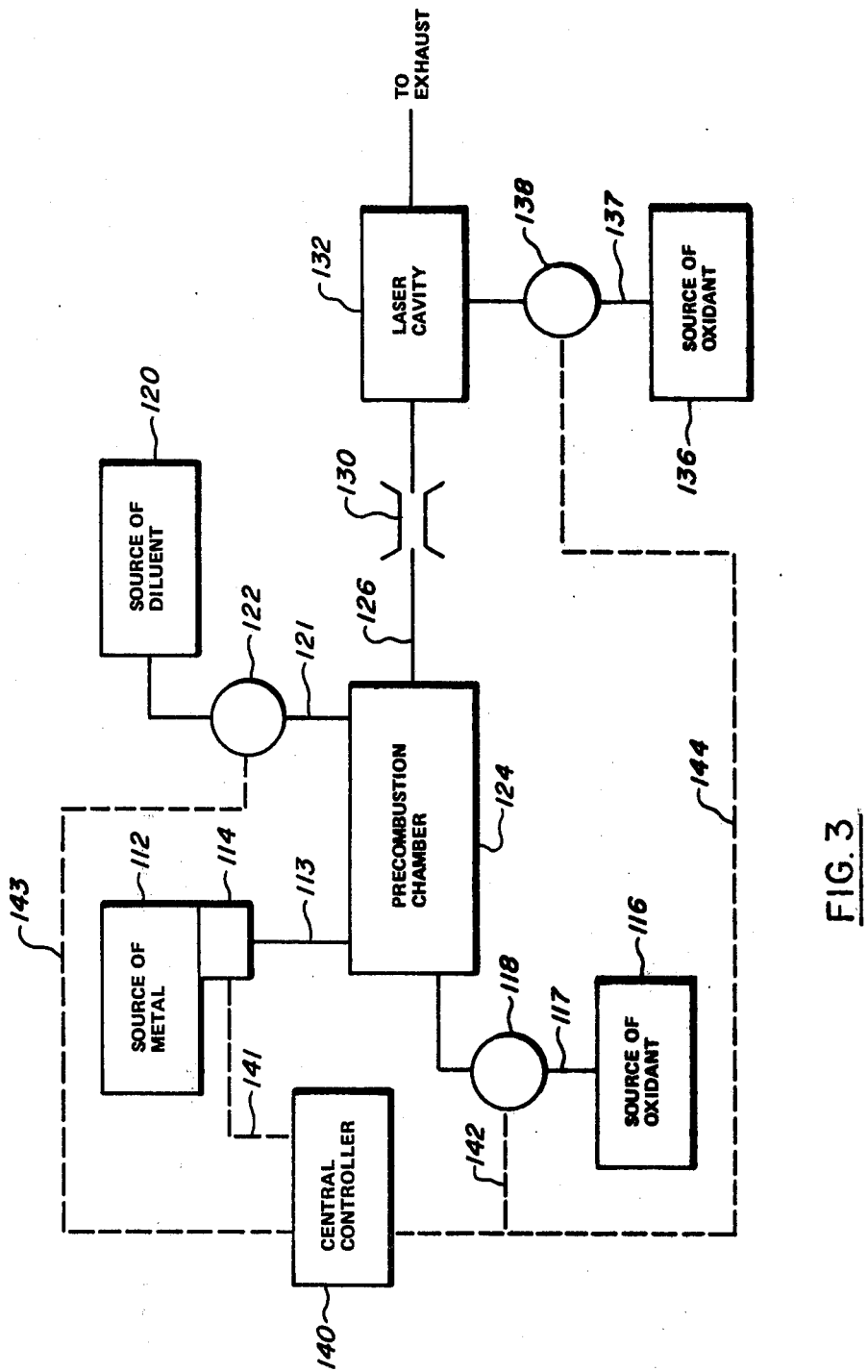
FIG. 3 is a block diagram of an automated system.

The system of FIG. 1 and the apparatus of FIG. 2 may be automated by monitoring the flow in each feed line and controlling the flows in both proportions and total amount through a central controller 140 as shown in FIG. 3. Metal, oxidant and diluent are supplied from sources thereof 112, 116 and 120, respectively, via lines 113, 117 and 121, respectively, to precombustion chamber 124. In the precombustion chamber 124, the oxidant reacts in an exothermic reaction with the metal which is supplied in excess. At least a portion of the excess metal is vaporized and drawn off from precombustion chamber 124 via line 126 and supersonic nozzle 130 and is fed to laser cavity 132. Oxidant is supplied from source 136 via line 137 to laser cavity 132 where it reacts with the metal vapor to form excited molecules and thereby lasing. Flow measuring and control devices 114, 118, 122 and 138 are connected to central controller 140 via data and control lines 141-144, respectively, and include structure for monitoring the respective flow rates and for transmitting signals indicative thereof to central controller 140. In response to the received flow rate data, central controller 140 transmits control signals to the flow measuring and control devices 114, 118, 122 and 138 to control the proportions of the flows in each of the lines as well as the total flow. Flow measuring and control devices 118, 122 and 138 which are in fluid lines would typically include a flow meter and solenoid operated valve and would have a pressure regulator located upstream of the solenoid. In the case of flow measuring and control device 114, a typical construction would include a selectively variable motor, such as 36 of FIG. 2, whose speed would be directly related to the rate of feeding of the metal to the precombustion chamber 124. Thus the monitoring and control of the speed of a selectively variable motor, such as 36 of FIG. 2, would provide control for the feeding of the metal to the precombustion chamber 124. The output of the system would be controllable through central controller 140 which is capable of proportionately increasing and decreasing the flows in the respective feed lines. The control of the output may be in response to operator initiated demands, a preprogrammed output rate or in response to a sensed demand or need.

The reactants and products of typical reactants would be as follows:

|  | EXAMPLE I | EXAMPLE II |
|---|---|---|
| Precombustor reactants | $Ba_{(s)}$, $F_2$ | $Mg_{(s)}$, $F_2$ |
| products (dominant) | $BaF_{2(s)}$, $Ba_{(v)}$ | $MgF_{2(s)}$, $Mg_{(v)}$ |
| Laser Combustion reactants | $Ba_{(v)}$, $N_2O$ | $Mg_{(v)}$, $F_2$ |
| products (initial) | $BaO$, $N_2$ | $MgF$, $F$ |
| laser transition | $A\,^1\Sigma - X\,^1\Sigma$ | $A\,^2\pi \rightarrow X\,^2\Sigma\,+$ |

Combinations of other metals such as tin, germanium, calcium, iron, aluminum and lithium with oxidizers such as nitrous oxide, ozone and fluorine may also be used to produce the necessary chemiluminescent reactions. It will be noted that in Example II, the dominant equilibrium product formed in the precombustor is $MgF_2$ while $MgF$ is formed initially in the laser cavity. However, further downstream, when the system approaches equilibrium, nearly all of the $MgF$ will be converted to $MgF_2$, if sufficient fluorine is available.

Although preferred embodiments of the present invention have been illustrated and described, other changes will occur to those skilled in the art. It is therefore intended that the scope of the present invention is to be limited only by the scope of the appended claims.

We claim:

1. A method for the continuous generation of pure metal vapor including the steps of:
   continuously supplying oxidant, and an excess of metal in the refined state;
   continuously reacting the metal and oxidant in an exothermic reaction whereby the excess metal present is vaporized; and
   continuously extracting the pure vaporized metal.

2. The method of claim 1 wherein the output of vaporized metal is regulated by proportionally controlling the supplying of the oxidant and metal.

3. A method for the continuous generation of pure metal vapor to produce lasing by vapor phase combustion of metal atoms including the steps of:
   supplying an oxidant selected from the group consisting of nitrous oxide, ozone, and fluorine, a diluent and an excess of metal in the refined state to a precombustion chamber;
   reacting the metal and oxidant in an exothermic reaction whereby the excess metal present is vaporized;
   extracting the vaporized metal from the precombustion chamber and passing the vaporized metal through a nozzle which expands the flow to supersonic speeds into a region wherein is located an optically resonant laser cavity; and
   introducing an oxidant selected from the group consisting of nitrous oxide, ozone and fluorine into the supersonic flow region of the laser cavity where the vaporized metal reacts with the introduced oxidant to produce suitable excited molecules and thereby lasing.

4. The method of claim 3 wherein the output of excited molecules is regulated by proportionally controlling the supplying of metal, oxidant and diluent to the precombustion chamber and the introducing of oxidant into the supersonic region of the laser cavity.

5. Apparatus for continuously generating metal vapor to produce lasing by vapor phase combustion of metal atoms including:
   precombustion chamber means for producing metal vapor;
   means for supplying an excess of metal in the refined state to said precombustion chamber means;
   means for supplying an oxidant selected from the group consisting of nitrous oxide, ozone and fluorine to said precombustion chamber means to react with said metal in an exothermic reaction whereby excess metal present is vaporized;
   means for supplying a diluent to said precombustion chamber means;
   optically resonant laser cavity means having an optical axis;
   means including a nozzle for withdrawing metal vapor and diluent from said precombustion chamber means, expanding the flow to supersonic speeds and delivering said withdrawn metal vapor and diluent to said laser cavity means at supersonic speeds;

means for introducing an oxidant selected from the group consisting of nitrous oxide, ozone and fluorine into the supersonic flow region of said laser cavity means where the vaporized metal reacts with introduced oxidant to produce suitable excited molecules and thereby lasing.

6. The apparatus of claim 5 further including means for removing particulates from the optical axis of the laser cavity.

* * * * *